United States Patent

Lard

[15] 3,640,763

[45] Feb. 8, 1972

[54] METHOD OF PRODUCING NONBURNING PAPER

[72] Inventor: Edwin W. Lard, 12703 Beaverdale Lane, Bowie, Md. 20715

[22] Filed: Aug. 12, 1969

[21] Appl. No.: 849,525

[52] U.S. Cl. ................... 117/126 GF, 117/126 GB, 117/137
[51] Int. Cl. ........................................ C03c 25/02, B44d 1/14
[58] Field of Search ........... 117/76 T, 137, 136, 138, 126 GF, 117/126 GB

[56] References Cited

UNITED STATES PATENTS

| | | | |
|---|---|---|---|
| 2,710,266 | 6/1955 | Hochberg | 117/126 X |
| 2,721,139 | 10/1955 | Arledter | 162/145 |
| 2,821,514 | 1/1958 | Sarbach et al. | 117/137 X |
| 3,274,136 | 9/1966 | Glesner et al. | 117/126 X |

*Primary Examiner*—William D. Martin
*Assistant Examiner*—Bernard D. Pianalto
*Attorney*—Kenneth E. Prince and Metro Kalimon

[57] ABSTRACT

A nonburning paper which is suitable for printing, writing, etc., is disclosed. The basic ingredients of the nonburning paper are: fiber glass, alkali metal silicates and halogenated elastomers. The method of producing this nonburning paper, which will extinguish itself in pure oxygen, is as follows: impregnating a sheet of fiber glass with a solution of an alkali metal silicate; evaporating the volatile solvent from the impregnated material; impregnating the treated fiber glass with a solution of a halogenated elastomer; and evaporating the volatile solvent from the impregnated material. The resultant sheet of paper is nonburning and, in those cases where its preparation is so tailored, it can be used as writing paper or can be used in conventional printing press, such as, offset lithographic printing press.

5 Claims, No Drawings

3,640,763

METHOD OF PRODUCING NONBURNING PAPER

BACKGROUND OF THE INVENTION

1. Object of the Invention

It is an objective of this invention to prepare paper which is a nonburning paper, which is self extinguishing in pure oxygen, which can be written or printed upon, which has high wet strength, which is relatively chemically inert and which is relatively inexpensive to produce. Other objectives of this invention will become apparent to one skilled in the art from the following description and claims.

2. Prior Art

A fiber glass paper, disclosed in U.S. Pat. No. 2,721,139, is formed by placing glass fibers into a water solution, a latex emulsion and colloidal silica. The latex is flocculated with alum or melamine plus urea resin. The mixture is then fabricated into sheet form on a papermaking machine. Mixtures of thick and thin (submicron) glass fibers are used in the patent as an essential factor. U.S. Pat. No. 2,568,850 involves coating a flexible paper sheet with a coating layer of bitumen, water-soluble alkali metal silicate, and humectant, namely triethylphosphate. Specific component ranges are given as essential to the invention therein. The paper sheet is used as an insulating layer which is fire resistive.

U.S. Pat. No. 1,148,013 involves depositing a soluble silicate, e.g., sodium silicate, solution on the surface of wood and allowed to dry. A paint containing a mineral pigment, a vehicle like linseed oil and a fatty acid. The acid decomposes the silicate solution and the silica is deposited on and between the fiber—making the wood fire resistant. The silicate solution can contain a refractory mineral pigment. A soluble aluminate solution can be used in place of the silicate solution. U.S. Pat. No. 2,101,449 discloses placing a particular composition on woven asbestos fibers. The coating composition contains a volatile solvent, a pigment, a plasticizer and a chlorinated rubber or vinyl resin. The composition is forced into the fabric with knife blade pressure, etc. The solvent is evaporated at an elevated temperature and preferably several coatings are applied to the asbestos. (Known asbestos fibers are obtained from serpentine asbestos, which is a mineral, chrysolite, a magnesium silicate, or from the amphibole asbestos, which include the minerals tremolite, actinolite, amosite, crocidolite, and anthophyllite. The amphibole asbestos are generally various silicates of magnesium, iron, calcium, and sodium.)

Calcium silicate particles are used as a pigment in certain rubber compositions.

BROAD DESCRIPTION OF THE INVENTION

The method for the preparation of a nonburning fiber glass paper which includes, initially, impregnating a sheet of fiber glass with a solution of an alkali metal silicate and a volatile solvent. The volatile solvent is then evaporated from the impregnated sheet. The impregnated sheet is then impregnated with a second solution of a halogenated elastomer and a volatile solvent. The volatile solvent is evaporated from the impregnated sheet, forming nonburning fiber glass paper. The paper can be used as a writing paper, etc.

The resultant paper is a sheet of fiber glass containing, first, a zone of an alkali metal silicate impregnated upon and absorbed in the sheet of fiber glass and, second, a zone of a halogenated elastomer impregnated upon and absorbed in the zone of an alkali metal silicate.

The resultant paper will not burn in air and is self-extinguishing in pure oxygen. In many cases, the paper has a tear strength of well over 100 grams. The resultant nonburning paper can readily be printed upon by convenient printing method, such as a conventional offset multilith process. These and many other advantages of this invention will be readily apparent to one skilled in the art upon reading this application.

DETAILED DESCRIPTION OF THE INVENTION

The composition of the glass fibers of the fiber glass cloth are not normally an essential consideration. Normally, the glass should be a silicate-base glass, but other oxides, such as alumina-boric acid, lithium oxide, sodium oxide, potassium oxide, beryllium oxide, magnesium oxide, calcium oxide, barium oxide, lead oxide, zinc oxide, iron oxide, boron oxide, vanadium oxide, tellurium oxide, and germanium oxide may be utilized. The glass may contain any number of minor constituents which are normally utilized therein to effect the coloring, absorption characteristics, etc., and characteristics of the glass. Glass fibers which can be used in fiber glass cloths are commercially available under the trade name "Fiberglas" from Owens-Corning Corp. Other commercially available glass fibers which can be used in fiber glass cloths are those available under the trade names "7900," "7913," and "8160,' ' from Corning Glass Works, and those available under the trade name "S-Glass" from Owens-Corning Co. The compositions of said commercially available glass fibers are found on page 572 of volume 10 in Kirk-Othmer, *Encyclopedia of Chemical Technology*, 2nd Edition, John Wiley & Sons, Inc., N.Y. (1966). Preferably, the average cross section dimension of the glass fibers is less than 3 microns and, even more preferably, in the range from about ½ to 1 micron. The length of the individual fibers of fiber glass can be any convenient length although it is preferred that the glass fibers be the length of about one-fourth inch. The cloth can consist of multiple layer of fiber glass cloth, or, the fiber glass paper can consist of a pressed material containing, if necessary, a noninterfering adhesive material in minor quantities.

The term alkali metal silicates includes silicates of the metals of Group IA of the periodic tables, for example: potassium silicate (weight ratios of $SiO_2:K_2O$ in water solution generally ranges from 2.5 to 1); sodium silicate (weight ratios of $SiO_2:Na_2O$ in water solution ranges widely, e.g., it can be 1:1, 3.4:1, 3.5:1); lithium silicate (insoluble in water); cesium silicate (insoluble in water); etc. Potassium and sodium silicates are preferred. Preferably, 1 to 15 weight percent (based on the weight of the fiber glass paper) of the alkali metal silicate is impregnated on the fiber glass cloth.

The preferred solvent in preparing alkali metal silicate solutions is water, but other suitable solvents can be used. The solvent must be nonreactive at all appropriate phases of the processing and must be volatile.

A halogenated elastomer is a natural or synthetic polymer containing halogen atoms with rubberlike characteristics. That term includes halogenated silicon rubbers, and rubbery polymers prepared by treating sodium polysulfide with dihalogenated materials.

Examples of suitable halogenated elastomers are: the "Hypalon" polymers (chlorosulfonated polyethylenes) prepared by E. I. duPont deNemours & Co., Inc., the "Neoprenes" (chloroprene), e.g., types GN and GRT; chlorobutyl compounds; chlorinated natural rubbers; polyfluorobutadiene; the Kel–F elastomers, e.g., type 5500; Viton elastomers; Fluoro elastomers; fluorinated silane elastomers; cured and cross-linked chlorinated polyethylene; etc.

One part of the halogenated elastomers can be admixed with 0.5 to 5 parts by weight polymeric materials such as polyvinyl chloride. Preferably, 1 to 10 weight percent (based on the weight of the fiber glass paper) of the halogenated elastomer is impregnated on the silicate-impregnated fiber glass cloth.

The solvents used in the halogenated elastomer solutions vary with what halogenated elastomer is being used, but in general the solvents must be volatile and must be nonreactive at all appropriate phases of the processing.

The silicate solution and the elastomer solution can be impregnated on the fiber glass sheet in any convenient manner, such as, dipping, spraying, etc.

This invention is illustrated, but not limited, by the following examples. In all those examples, unless otherwise noted, all parts and percentages are be weight.

EXAMPLE 1

An 8 inch by 11 inch piece of Owens-Corning Fiberglas Cloth No. 113-38 (3.0 mils thick, with 60 ends and 64 picks per inch) was dipped into a 10 percent solution of sodium silicate (Fisher Scientific Cat. No. So-S-338, 40°-42°Be.) in water. The $SiO_2:Na_2O$ weight ratio was 3.1 to 1. The additional weight of the dried sodium silicate was 5 percent. The treated cloth was then dipped into a 15 percent solution of "Fluoro Elastomer" (Gates Engr. Co. FR-86-white KV 19048) in ethyl acetate. The impregnated paper was dried in an oven at 120° C. for 10 minutes. The additional weight of the dried "Fluoro Elastomer" was 7 percent. The resulting sheet was stiff and had a good writing surface. Sheets prepared in this manner were printed with an offset press and did not burn when exposed to a flame in 100 percent oxygen.

EXAMPLE 2

Example 1 was repeated, except that potassium silicate was used in place of the sodium silicate. The $SiO_2:K_2O$ weight ratio was 2 to 1. The resulting stiff sheet was nonburning and had a good writing surface.

EXAMPLE 3

Example 1 was repeated, except that Hypalon 30 was used in place of Fluoro Elastomer. The resulting stiff sheet was nonburning and had a good writing surface.

EXAMPLE 4

Example 1 was repeated, except that Kel-F elastomer type 3700 (a copolymer of vinylidene fluoride and chlorotrifluoroethylene commercially available from Minnesota Mining and Manufacturing Company) was used in place of Fluoro Elastomer. The resulting stiff sheet was nonburning and had a good writing surface.

EXAMPLE 5

Example 1 was repeated, except that Neoprene GN was used in place of Fluoro Elastomer. The resulting stiff sheet was nonburning and had a good writing surface.

EXAMPLE 6

Example 5 was repeated, except that potassium silicate was used in place of the sodium silicate. The $SiO_2:K_2O$ weight ratio was 2 to 1. The resulting stiff sheet was nonburning and had a good writing surface.

It is claimed:
1. The method for the preparation of a nonburning fiber glass paper which consists essentially of:
   a. impregnating a sheet of fiber glass with an aqueous solution of an alkali metal silicate having a silica to alkali metal oxide ratio of 1:1 to 3.5:1 and a volatile solvent in an amount sufficient to incorporate between 1 to 15 weight percent of silicate based on the weight of the fiber glass;
   b. evaporating said volatile solvent of step (a) from said impregnated sheet;
   c. impregnating the sheet of step (b) with a solution of a halogenated elastomer and a volatile solvent in an amount sufficient to incorporate between 1 to 10 weight percent of elastomer based on the weight of the fiber glass; and
   d. evaporating said volatile solvent of step (c) from said impregnated sheet, whereby said nonburning fiber glass paper is formed.

2. The method of claim 1 wherein said alkali metal silicate is sodium silicate, the molar ratio of $Na_2O$ to $SiO_2$ being from 1:1 to 3.5:1, and its solvent is water.

3. The method of claim 2 wherein said evaporation step (b) is conducted at 120° C.

4. The method of claim 1 wherein the halogenated elastomer is a fluorinated elastomer and its solvent is ethyl acetate.

5. The method of claim 4 wherein said evaporation step (d) is conducted at 120° C.

* * * * *